March 17, 1964 E. LONG 3,125,160
HEAT INSULATION DEVICES
Filed June 24, 1958 2 Sheets-Sheet 1

Fig. 1

INVENTOR
EVERETT LONG
BY Lawson and Taylor
ATTORNEYS

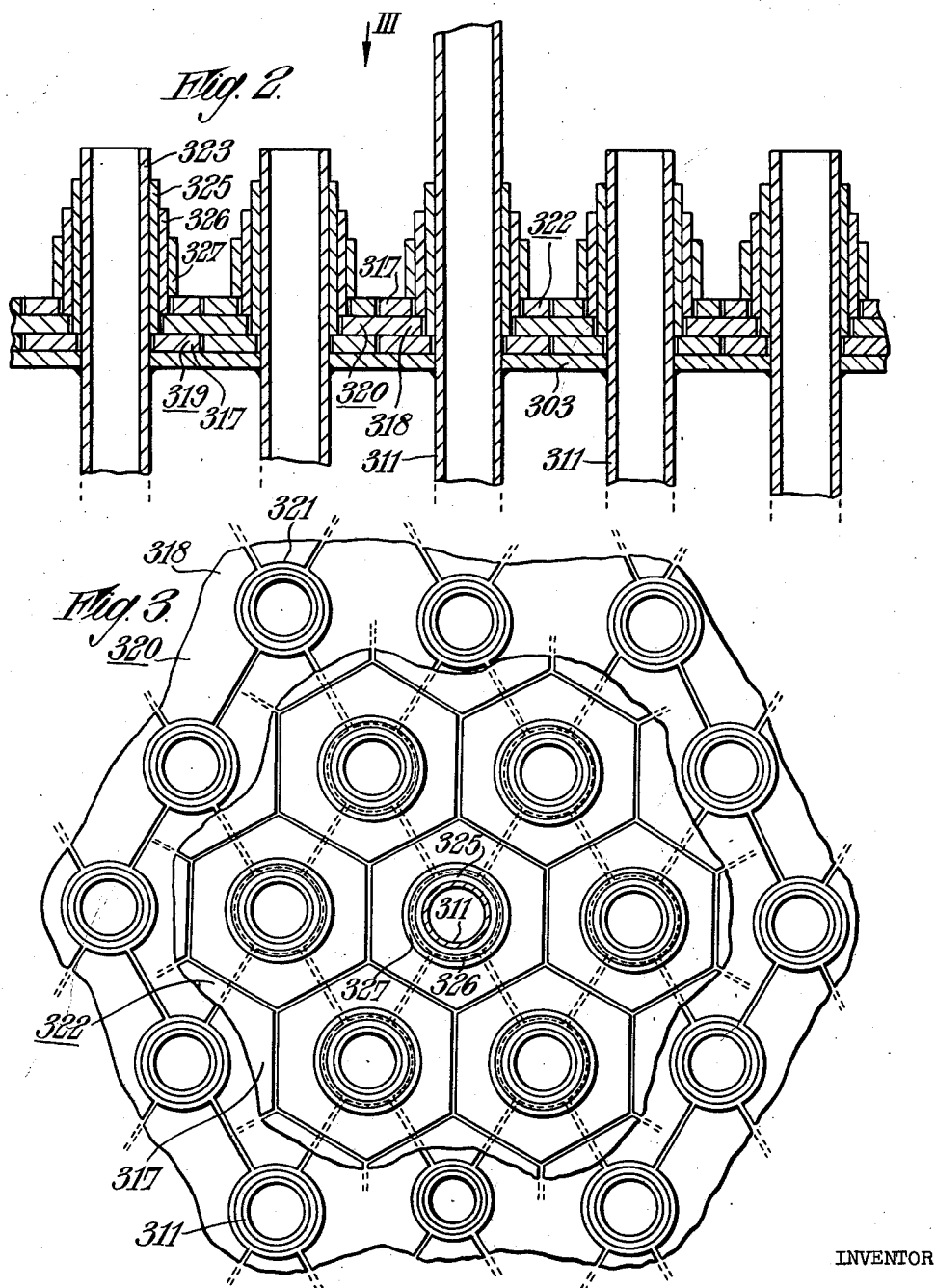

United States Patent Office 3,125,160
Patented Mar. 17, 1964

3,125,160
HEAT INSULATION DEVICES
Everett Long, Culcheth, near Warrington, England, assignor to United Kingdom Atomic Energy Authority, London, England
Filed June 24, 1958, Ser. No. 744,154
Claims priority, application Great Britain June 24, 1957
4 Claims. (Cl. 165—135)

This invention relates to heat insulating means and has application in a sodium-graphite nuclear reactor.

The conventional method of extracting heat from a nuclear reactor involves a single pass of coolant through the core of the reactor. In this method hot and cool coolant can be readily separated from one another. In one form of liquid sodium cooled graphite moderated reactor a form of re-entrant cooling is use such that hot and cool header tanks are on top of the reactor core. A single container is provided which operates at a reasonably uniform temperature and is separated into hot and cool tanks by a division plate, and the arrangement involves the passage of pipes through the hot and cool tanks. A problem arises in the above arrangement in that thermal insulation needs to be provided for members separating hot and cool coolant both to avoid degradation of the heat in the hot tank, by heat transfer to the cool tank and also to avoid steep temperature gradients through relatively thin members. Conventional thermal insulation is unsatisfactory owing to the thermal deflections and stresses which are set up.

According to the invention in a tank divided for the containment of hot and cold liquids into upper and lower tanks by a horizontal diaphragm and having pipes passing from the upper tank, through the diaphragm and through the lower tank, there are provided on the diaphragm layers of tiles spaced from one another at their edges to accommodate for thermal expansion, the tiles in any layer overlapping tiles in adjacent layers.

One embodiment of the invention will now be described by way of example with reference to the accompanying drawings in which FIGURE 1 is a sectional horizontal elevation,
FIGURE 2 is an enlarged section of FIGURE 1,
FIGURE 3 is a plan in the direction of the arrow III in FIGURE 2.

In the drawings there is shown a tank 300 divided into upper and lower tanks 301 and 302 by a horizontal diaphragm 303. The upper tank 301 has a body 304 joined with the body 305 of the lower tank 302 by a forged sectional ring 306. The diaphragm 303 which is of dish shape is seam welded to an internal flange 307 of the forged ring 306. The lower tank 302 is divided into an inner circular region 308 and an outer annular region 309 by a ring girder 310 of I section spanning between the body 305 of the lower tank 302 and the diaphragm 303. Pipes 311 passing through the lower tank 302 terminate in the upper tank 301 and are associated with stand pipes 312 in connection with the upper tank 301 through the body 304 thereof. The annular region 309 of the lower tank 302 is extended inside the upper tank 301 by tubular members 313 containing pump vessels 314 seam welded in passage through the body 304 of the upper tank 301. The pump vessels 314 are in connection with the inner region 308 of the lower tank 302 through pipes 315 passing through the ring girder 310 and with the annular region 309 through open ended pipes 316.

Thermal insulation is provided on the diaphragm 303 comprising alternate layers of hexagonal steel tiles 317 and diamond shaped steel tiles 318. In the drawings there is shown a lower layer 319 of hexagonal tiles 317 resting on the diaphragm 303 and centrally drilled to allow the passage of the pipes 311. The hexagonal tiles 317 are spaced edge to edge to allow for thermal expansion. On top of the lower layer 319 of hexagonal tiles 317 there is an intermediate layer 320 of diamond shaped tiles 318 located overlapping the hexagonal tiles 317 of the layer 319 and also spaced in edge to edge relationship. The tiles 318 of the intermediate layer 320 are cut away at the corners 321 to accommodate the pipes 311. On top of the intermediate layer of tiles 320 there is an upper layer 322 of hexagonal tiles 317 in spaced edge to edge relationship and overlapping the tiles 318 of the intermediate layer 320.

The upper ends 323 of the pipes 311 contained within the upper tank 301 are fitted with concentric thermally insulating sleeves, viz an inner sleeve 325 resting on the lower layer 319 of hexagonal tiles 317, an intermediate sleeve 326 resting on the intermediate layer 320 of diamond shaped tiles 318 and an outer sleeve 327 resting on the upper layer 322 of hexagonal tiles 317. The tubular members 313 (FIGURE 1) are also thermally insulated by composite sleeves 328 and the vertical sides 329 of the diaphragm 303 are thermally insulated by layers of overlapping rectangular tiles 330. The body of the upper tank 301 is thermally insulated by layers of thin steel plates 331 and is covered externally by a layer 332 of conventional thermal insulation.

A cold sodium bleed pipe 333 is provided from the central region 308 of the lower tank 302 to the space 334 between the vertical sides 329 of the diaphragm 303 and the body 305 of the lower tank 302.

The upper tank 301 contains hot liquid and the lower tank 302 contains cool liquid, the layers of tiles 319, 320 and 322 on the diaphragm 303, the sleeves 325, 326 and 327 on the pipes 311, the sleeves 328 on the tubular members 313 and the tiles 330 on the vertical side 329 of the diaphragm 303 providing thermal insulation between the hot and cold liquids and reducing the thermal gradient at their points of location while being capable of unrestrained thermal expansion with temperature fluctuation of the hot and cold liquids.

The tiles 317, 318, etc., will tend to bow with the thermal gradient through them and expand and contract as the temperature in the tanks changes. All this movement is accommodated by the spacing between the tiles 317, 318, etc. The temperature difference through the diaphragm 303 is about 25° C. for a temperature difference of 200° C. between the tanks 301 and 302. Thus the diaphragm 303 is not subjected to any substantial thermal stresses. The space between the tiles is made small so that liquid between the tiles is kept small in volume and the overlapping of the tiles in conjunction with the small spaces between them prevents convection of heat via the liquid.

The upper tank 301 is only partially filled with hot sodium which is blanketed by a layer of nitrogen gas. The nitrogen blanket is at the temperature of the hot sodium (circa 500° C.) and the layers of thin steel plates 331 thermally insulate the body 304 of the upper tank 301 from the hot nitrogen.

To prevent stagnation of sodium in the space 334 between the diaphragm 303 and the body 305 of the lower tank 302 cold sodium is passed through the bleed pipe 333 into this space 334.

I claim:

1. In combination with a tank having a metal diaphragm therein dividing the tank into a cold fluid compartment and a hot fluid compartment and pipes extending through the diaphragm into each of the compartments for conveying fluid from one compartment into the other, means for heat insulating the diaphragm comprising layers of tiles extending adjacent and parallel to at least one side of the diaphargm, said pipes passing through the layers of tiles, the tiles in each layer being spaced from one another at their edges and overlapping the tiles in adjacent layers.

2. The combination according to claim 1 further comprising means for heat insulating the pipes including sleeves engaging with the tiles and enclosing the pipes on at least said one side of the diaphragm.

3. In combination with a tank having a metal diaphragm therein dividing the tank into a cold fluid compartment and a hot fluid compartment and pipes extending through one compartment and the diaphragm into the other compartment and each terminating therein in an open end for conveying fluid re-entrantly from said other compartment into said one compartment, means for heat insulating the diaphragm comprising layers of tiles extending adjacent and parallel to the diaphragm in said other compartment, said pipes passing through the layers of tiles, the tiles in each layer being spaced from one another at their edges and overlapping the tiles in adjacent layers.

4. The combination according to claim 1 wherein the tiles of alternate layers are of hexagonal shape and the tiles of the other layers are of basic diamond shape, at least a portion of the tiles of hexagonal shape having central openings through which the pipes extend and the tiles of basic diamond shape adjacent said portion being adapted at their edges to pass the pipes.

References Cited in the file of this patent
UNITED STATES PATENTS

| | | |
|---|---|---|
| 526,208 | Wheeler | Sept. 18, 1899 |
| 2,807,727 | Fermi et al. | Sept. 24, 1957 |

OTHER REFERENCES

Proceedings of the International Conference on the Peaceful Uses of Atomic Energy, vol. II, United Nations, New York, N.Y., 1956. Held in Geneva Aug. 8–20, 1955, p. 345.

Nucleonics, vol. 13, No. 6, June 1955, p. 68.